US010845983B2

(12) United States Patent
VanBlon et al.

(10) Patent No.: US 10,845,983 B2
(45) Date of Patent: Nov. 24, 2020

(54) VIRTUAL MULTI-DISPLAY (71) Applicant: Lenovo (Singapore) Pte. Ltd., Singapore (SG)

(72) Inventors: Russell Speight VanBlon, Raleigh, NC (US); Neal Robert Caliendo, Jr., Raleigh, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 919 days.

(21) Appl. No.: 14/518,628

(22) Filed: Oct. 20, 2014

(65) Prior Publication Data

US 2016/0110062 A1 Apr. 21, 2016

(51) Int. Cl.
*G06F 3/0488* (2013.01)
*G06F 3/14* (2006.01)
*G09G 5/14* (2006.01)

(52) U.S. Cl.
CPC .......... *G06F 3/0488* (2013.01); *G06F 3/1431* (2013.01); *G09G 5/14* (2013.01); *G09G 2354/00* (2013.01); *G09G 2360/04* (2013.01)

(58) Field of Classification Search
CPC ............. G06F 3/1423; G06F 3/1454; G06F 2203/04803; G06F 1/1647; G06F 9/4445; G06F 3/1446; G06F 3/1431; G06Q 10/10; G06Q 10/101; G08B 13/19665; H04N 1/00129; G09G 2370/022; G09G 5/006; G09G 2356/00; G09G 2320/0693; G09G 2370/042
See application file for complete search history.

(56) References Cited

U.S. PATENT DOCUMENTS

| | | | | |
|---|---|---|---|---|
| 5,923,307 A * | 7/1999 | Hogle, IV | ........... | G06F 3/04897 345/1.3 |
| 8,154,473 B2 * | 4/2012 | Engel | ........... | G09G 3/20 345/4 |
| 8,266,550 B1 * | 9/2012 | Cleron | ........... | G06F 1/1633 715/863 |
| 8,954,872 B2 * | 2/2015 | Orr | ........... | G06F 3/0482 345/1.3 |
| 9,811,252 B2 * | 11/2017 | Harada | ........... | G06F 1/1616 |
| 2009/0172556 A1 * | 7/2009 | Malmstrom | ........... | G06F 3/0481 715/736 |
| 2011/0037711 A1 * | 2/2011 | Siddiqui | ........... | G06F 3/1423 345/173 |
| 2011/0154248 A1 * | 6/2011 | Tsuruoka | ........... | G06F 3/1446 715/781 |
| 2011/0249015 A1 * | 10/2011 | Lonkar | ........... | G06F 3/1431 345/589 |
| 2012/0032783 A1 * | 2/2012 | Ahn | ........... | G06F 3/1423 340/6.1 |

(Continued)

*Primary Examiner* — Ryan F Pitaro
(74) *Attorney, Agent, or Firm* — Ference & Associates LLC (57) ABSTRACT

An embodiment provides a method, including: displaying, on a first display, an application view; providing an area of the first display that is associated with a second display; receiving, from a user, an input associating the application view with the area of the first display; and repositioning, using a processor, the application view from the first display to a second display after receiving the input. Other aspects are described and claimed.

20 Claims, 5 Drawing Sheets

(56) References Cited

U.S. PATENT DOCUMENTS

| | | | |
|---|---|---|---|
| 2014/0006472 A1* | 1/2014 | Brink | G06F 3/1431 |
| | | | 709/201 |
| 2014/0043210 A1* | 2/2014 | Stein | G06F 9/452 |
| | | | 345/2.1 |
| 2014/0089821 A1* | 3/2014 | Rios, III | G06F 3/14 |
| | | | 715/761 |
| 2014/0380201 A1* | 12/2014 | Massand | G06F 3/1423 |
| | | | 715/761 |
| 2015/0169183 A1* | 6/2015 | Son | G06F 3/0482 |
| | | | 715/765 |
| 2017/0090710 A1* | 3/2017 | Maekawa | G06F 3/0481 |

\* cited by examiner

VIRTUAL MULTI-DISPLAY

BACKGROUND

Information handling devices ("devices"), for example desktop computers, workstations, or even laptop, tablet and smart phone computing devices often are used in connection with multiple displays. In this use scenario, a device is connected (wired or wireless connections may be used) to more than one display, e.g., to provide a better viewing experience, to separate different application views or windows onto different displays, etc.

Currently, a user can arrange windows across displays by dragging them using, e.g., input via the keyboard and/or mouse, to the intended displays. Although the user can use the keyboard and/or mouse to move an application window to another display, this can be cumbersome to do for every application window. Moreover, many users are also unaware of advanced keyboard application switching that is available via use of key inputs.

BRIEF SUMMARY

In summary, one aspect provides a method, comprising: displaying, on a first display, an application view; providing an area of the first display that is associated with a second display; receiving, from a user, an input associating the application view with the area of the first display; and repositioning, using a processor, the application view from the first display to a second display after receiving the input.

Another aspect provides a device, comprising: at least one display; a processor operatively coupled to the at least one display; and a memory operatively coupled to the processor that stores instructions executable by the processor, the instructions comprising: instructions that display, on a first display, an application view; instructions that provide an area of the first display that is associated with a second display; instructions that receive, from a user, an input associating the application view with the area of the first display; and instructions that reposition the application view from the first display to a second display after receiving the input.

A further aspect provides a program product, comprising: a storage device having program code embodied therewith, the program code being executable by a processor and comprising: program code that displays, on a first display, an application view; program code that provides an area of the first display that is associated with a second display; program code that receives, from a user, an input associating the application view with the area of the first display; and program code that repositions using a processor, the application view from the first display to a second display after receiving the input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates an example of a virtual multi-display system.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Currently, a user can arrange windows across displays by dragging them using touch/keyboard/mouse to the intended displays. It is worth mentioning that a display, as used herein, may take a variety of forms, including but not limited to a monitor, an OLED display, an LCD display, a television, a projection display, etc. In this description, the term "monitor" is used throughout as a non-limiting example of one type of display. However, other types of displays may be used, and different types of displays may be used in various combinations.

While dragging windows to different displays or monitors is available, however, using touch input alone, there is no way to drag a window to a non-touch monitor. Moreover, while a user can use the keyboard/mouse to move the window, this can be cumbersome to do for every application. Many users are also unaware of advanced keyboard application window switching (between monitors) is available, e.g., via pressing the "WINDOWS" key and an arrow key at the same time. WINDOWS is a registered trademark of Microsoft Corporation in the United States and other countries.

While there are manual options (e.g., use of mouse, a combination of keyboard key presses, etc.) for arranging windows or views in a multi-monitor environment, a few problems persist. For example, although possible to move windows with conventional arrangements, it is often a tedious process to arrange windows across multiple monitors upon connect/disconnect of a new monitor. Moreover, transferring windows from touch to non-touch monitors can't be done using just touch input. Still further, even if a user manages to arrange the windows or views as he or she desires, after disconnecting a monitor from a multi-monitor environment, applications have no memory (or profile) as to which monitor they should appear on. This is especially true when a different number of monitors exist at different work environments.

Accordingly, an embodiment allows multi-selection of applications or windows/views in a virtual monitor view, allowing the user to quickly move multiple applications/windows at once, e.g., using an action similar to a copy/paste operation.

An embodiment may offer the user helpful monitor suggestions, e.g., made based on the size of a current window or content within the window. For example, if window content does not fit without scrolling, and another monitor exists that makes more content visible, an embodiment may prompt or notify the user that the window or view might best be moved to that other monitor for a view of more of the content.

An embodiment creates application or location profiles based on a variety of factors, e.g., home, work, etc., so that applications are directed to preset monitors or monitors of a predetermined type. An embodiment may change a currently active profile, e.g., based on which applications are open, which applications are in use, or based on the current location of the primary device, the user, etc. Thus, an embodiment may automatically arrange windows or views across monitors based on user preference. Windows or views also may be re-arranged when interaction with a new set of applications is detected. Switching between different sets of applications for example may trigger a suggested re-arranging of monitors, communicated to the user. Monitor profiles may vary based on the number/resolution of monitors available and may be adjusted to meet a particular user's preferences.

When disconnecting/reconnecting one or more monitors, application windows or views may retain their assigned monitor so that they go back to (launch to, open to) that monitor when it gets re-connected. Also, windows or views created by a single application (e.g., an OUTLOOK email client application main window or view, a new message window or view, etc.) may be directed to the same monitor containing the main application window or view. OUTLOOK is a registered trademark of Microsoft corporation in the United States and other countries.

The illustrated example embodiments will be best understood by reference to the figures. The following description is intended only by way of example, and simply illustrates certain example embodiments.

Figure 1:
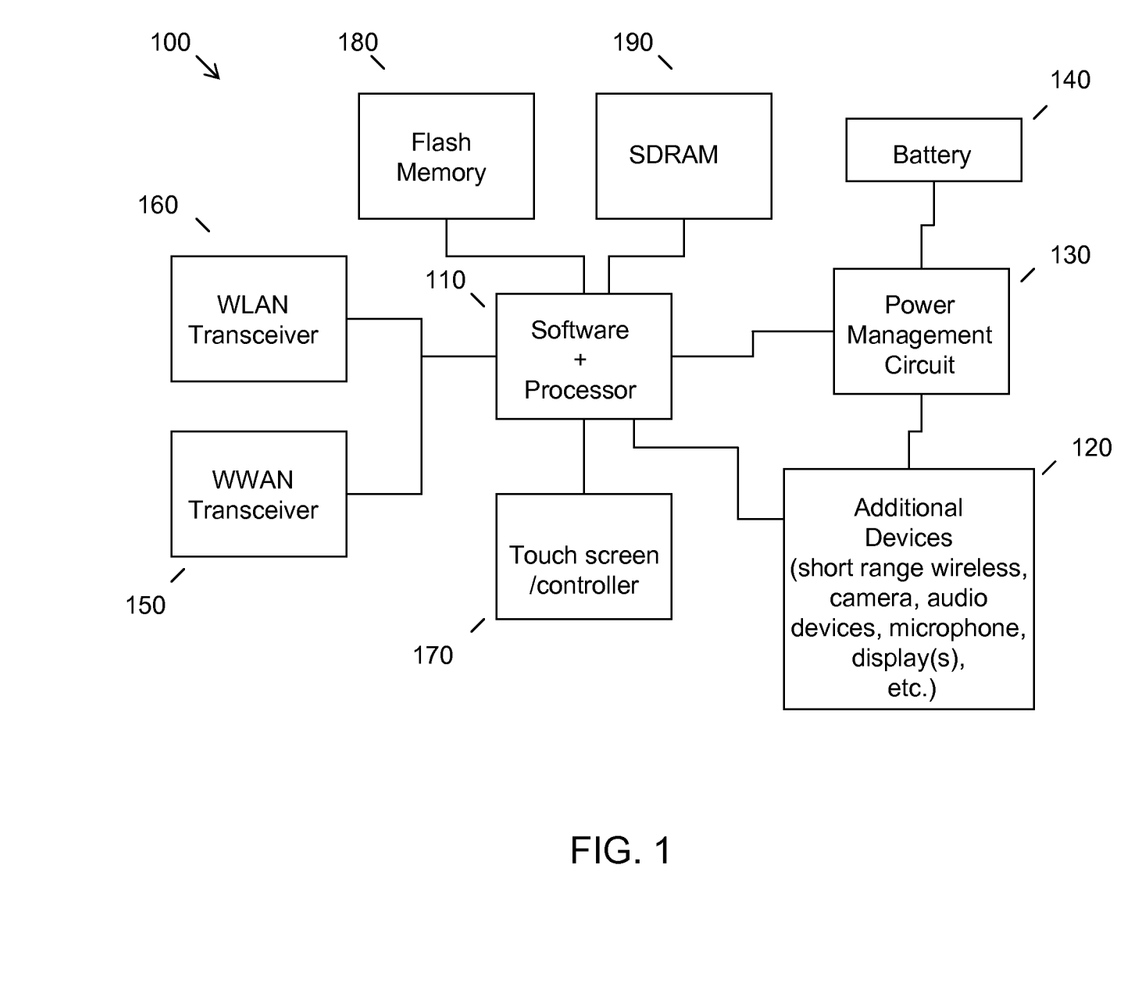
FIG. 1 illustrates an example information handling device.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. Additional devices may include short range wireless radio(s), such as BLUETOOTH radios, for communicating with other devices, or other communication devices or ports, e.g., for connecting to an external monitor. Near field communication element(s) may also be included as additional device(s) 120. Commonly, system 100 will include a touch screen/controller 170 for primary data input and display. System 100 also typically includes various memory devices, for example flash memory 180 and SDRAM 190.

Figure 2:
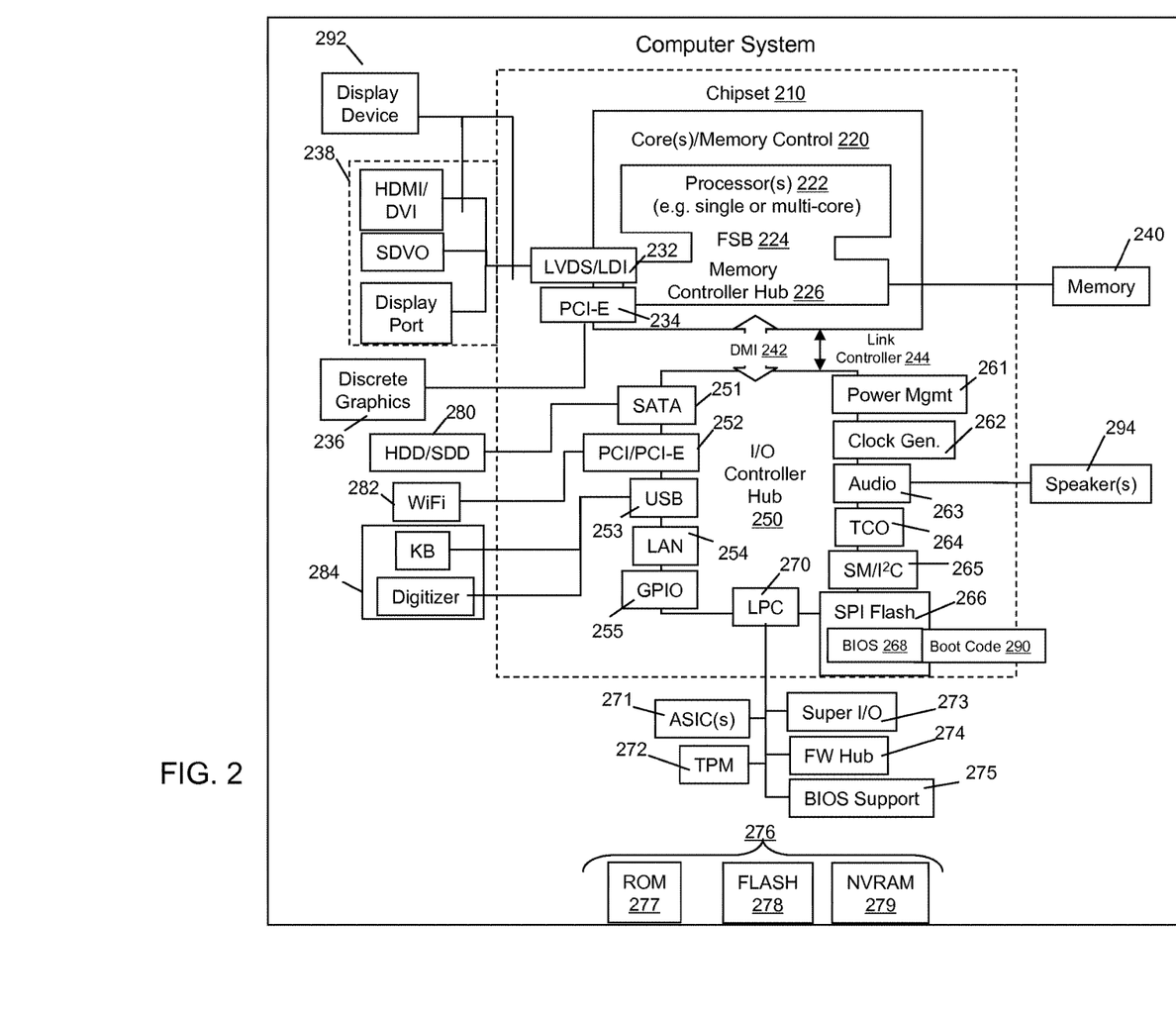
FIG. 2 illustrates another example information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as desktop computers, laptop computers, tablet or other mobile computing devices, etc. As will be readily apparent to those having skill in the art, such devices may be used in connection with multiple monitors. That is, two or more monitors may be operatively coupled to such devices such that data may be rendered on the two or more monitors, e.g., in a coordinated fashion.

Figure 3A:
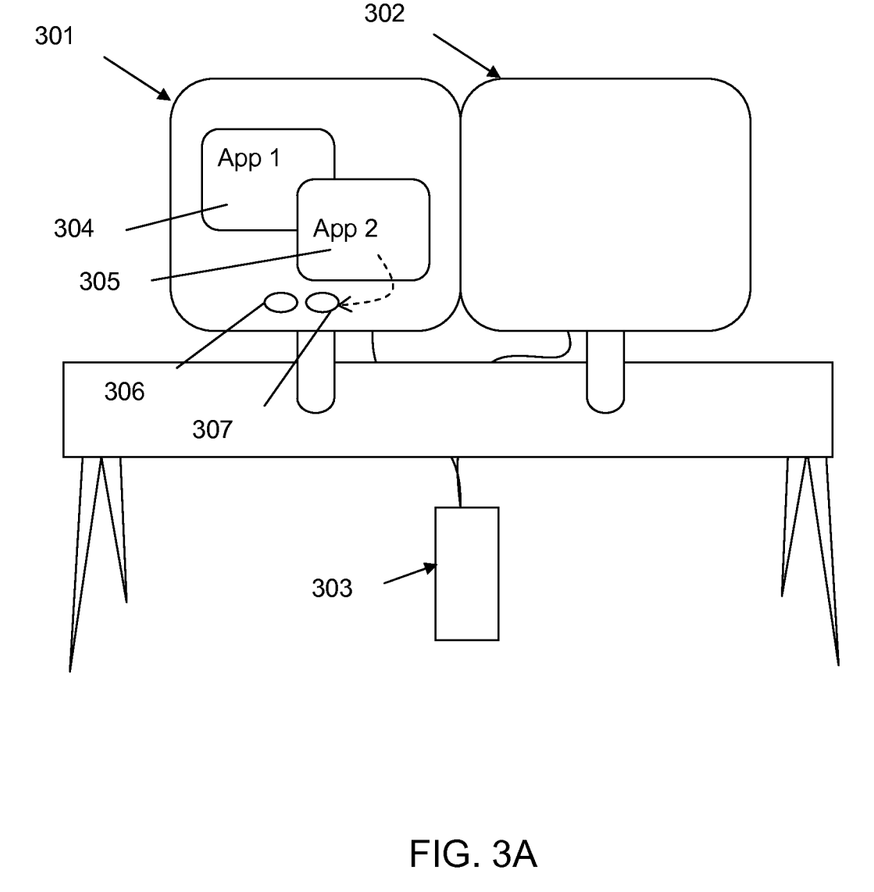
Figure 3B:
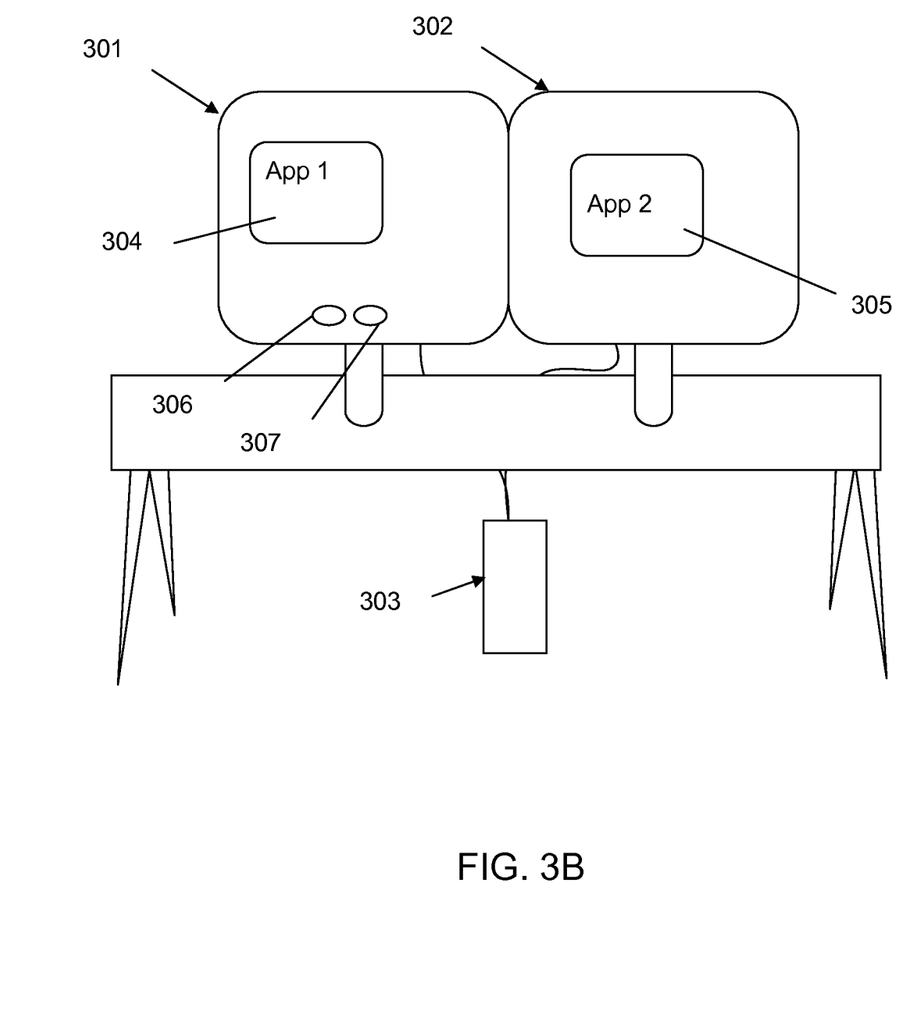

Referring to FIG. 3(A-B), an example of a virtual multi-monitor system is illustrated. As illustrated in FIG. 3A, two monitors 301 and 301 are operatively connected to a computing device 303. Here the connection is shown to be a wired connection, although this is not a requirement.

In the first of the multiple monitors, i.e., monitor 301, two application windows or views 304, 305 are displayed. Also displayed are two virtual monitor icons 306, 307. In an embodiment, a user may rearrange an application window, e.g., window 305, to another monitor, e.g., monitor 302, by virtue of touch input. As illustrated, a user may drag window 305 to virtual monitor icon 307 in order to place application view 305 on monitor 302. It should be noted that while dragging view 305 to virtual monitor icon 307 is used in this illustration, other touch inputs may be used, e.g., a first touch on view 305 followed by a touch on virtual monitor icon 307, the reverse of this input sequence, etc.

In FIG. 3B the effect of such user input is illustrated. Following touch input to application view 305 and virtual monitor icon 307, in FIG. 3B the application window or view for "App 2" 305 has been rearranged to appear on monitor 302 rather than monitor 301. Although not illustrated in this example, virtual monitor icons may be displayed as well on monitor 302.

Thus, an embodiment permits easily rearranging application windows or views between monitors 301 and 302. This may be accomplished via simple touch input, e.g., by use of virtual monitor icons 306 and 307. Therefore, a user need not manually drag the application views 304, 305 to respective monitors, e.g., using a mouse input device, nor does the user have to recall complex short cut key arrangements for moving the application views 304, 305. Rather, a user may place the application windows 304, 305 on a monitor of choice via simple touch interface.

As described herein, an embodiment provides a capability to suggest which monitor, e.g., 301 or 302, an application view, e.g., 304 or 305, should be displayed on. A variety of factors may be used in this regard, with the result being helpful suggestions as to which monitor might be used for display. For example, the size and/or underlying content of an application window or view may be matched to an appropriately sized monitor or a monitor with other capabilities (e.g., screen resolution, built in speakers, etc.) An embodiment also may track and store user preferences with respect to monitor choices (monitory type, specific monitor identification, etc.) that a user has made such that a suggestion of that monitor (or monitor type) might be made when next a multi-monitor scenario is encountered for application views or windows. In some cases (e.g., according to user preferences or in cases of high confidence of a suggested monitor), an embodiment may automatically rearrange one or more application windows or views.

Figure 4:
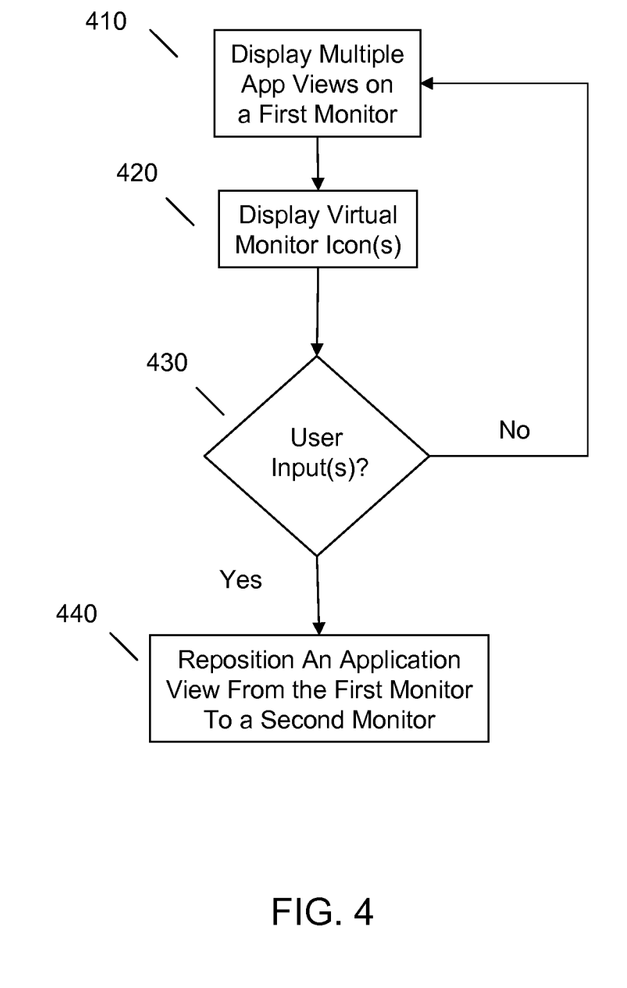
FIG. 4 illustrates an example of using a virtual multi-display icon to rearrange application views or windows.

FIG. 4 outlines a general method of using a virtual multi-monitor icon to rearrange application views or windows. Illustrated is a method in which a plurality of application views are displayed at 410 on a first monitor in a multiple monitor environment. Additionally, an embodiment displays at 420, on the first monitor, a virtual monitor icon.

At 430 it is determined if an input is received from a user associating an application view of the plurality of application views with the virtual monitor icon on the first display. For example, an embodiment detects if a user has touched or interfaced with an application view and a corresponding virtual monitor icon at 430. If not, of course the current display may be maintained.

However, if such a user input is received, an embodiment repositions at 440 the application view the user has interfaced with from the first monitor to a second monitor, as indicated by the virtual monitor icon that has been selected by the user. This permits a user to easily use touch interface with the display (e.g., a touch screen display) to reposition an application window from a first monitor to a second monitor.

One or more virtual monitor icons may be displayed. For example, the displaying of a virtual monitor icon may include displaying a number of virtual icons matching a number of connected monitors. This way, the visual appearance of the virtual monitor icons will logically match the physical landscape of the virtual monitor environment, assisting the user in making choices as to which virtual monitor icon to select.

As described herein, an embodiment may suggest a monitor for an application view displayed on the first monitor. Thus, the displaying of a virtual monitor icon may include displaying a virtual monitor icon in accordance with a suggested monitor. This may be implemented in a variety of ways, e.g., color highlighting or flashing an application window and a virtual monitor icon. This acts to indicate (visually in this example) which physical monitor is suggested for which application window, e.g., by virtue of indicating a corresponding virtual monitor icon.

As described herein, an embodiment may suggest a monitor (and indicate a corresponding virtual icon) in a variety of ways. For example, the suggested monitor may be selected based on a size of an application view. As another example, the suggested monitor may be selected based on content within an application view. As a further example, the suggested monitor may be selected based on application type associated with an application view. A combination of factors may be used in selecting a monitor for suggestion, including use of historical data, e.g., as for example stored in a user profile.

As will be appreciated by one skilled in the art, various aspects may be embodied as a system, method or device program product. Accordingly, aspects may take the form of an entirely hardware embodiment or an embodiment including software and hardware that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication or short range wireless communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of an information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    displaying, on a display, at least one application view and at least two virtual monitor icons;
    receiving, from a user, an input selecting at least one of the at least one application views and selecting a display from the group consisting of: the display and another display, each being represented by one of the at least two virtual monitor icons;
    generating a profile for an identified context based upon associating the selected at least one application view with the selected display, wherein the profile is based on a user preference of a display selection of the at least one application view, parameters of the selected display, a location of the display, and a set of applications detected, wherein an indication of the at least two virtual monitor icons associated with the selected display is provided upon subsequent identification of the identified context based upon the profile; and
    repositioning, based upon an activation of the profile of the identified context, the selected at least one of the at least one application views to the associated selected display.

2. The method of claim 1, wherein the user input is touch input.

3. The method of claim 2, wherein the touch input is provided to a touch sensitive layer of the display.

4. The method of claim 1, further comprising suggesting a display for an application view.

5. The method of claim 4, wherein the suggested display is selected based on a size of an application view.

6. The method of claim 4, wherein the suggested display is selected based on content within an application view.

7. The method of claim 4, wherein the suggested display is selected based on application type associated with an application view.

8. The method of claim 1, wherein the identified context comprises a location of access of the at least one application view.

9. The method of claim 1, wherein the generating a profile comprises generating a profile for an identified user accessing the at least one application view.

10. The method of claim 1, wherein the generating a profile is based upon the at least one application view.

11. A device, comprising:
    at least one display;
    a processor operatively coupled to the at least one display; and
    a memory operatively coupled to the processor that stores instructions executable by the processor, the instructions comprising:
    instructions that display, on a display of the at least one display, at least one application view and at least two virtual monitor icons;
    instructions that receive, from a user, an input selecting at least one of the at least one application views and selecting a display from the group consisting of: the display and another of the at least one displays, each being represented by one of the at least two virtual monitor icons;
    instructions that generate a profile for an identified context based upon associating the selected at least one application view with the selected display, wherein the profile is based on a user preference of a display selection of the at least one application view, parameters of the selected display, a location of the display, and a set of applications detected, wherein an indication of the at least two virtual monitor icons associated with the selected display is provided upon subsequent identification of the identified context based upon the profile; and instructions that reposition, based upon an activation of the profile of the identified context, the selected at least one of the at least one application views to the associated selected display.

12. The device of claim 11, wherein the user input is touch input.

13. The device of claim 12, wherein the touch input is provided to a touch sensitive layer of the display.

14. The device of claim 11, wherein the instructions further comprise instructions that suggest a display for an application view.

15. The device of claim 14, wherein the suggested display is selected based on a size of an application view.

16. The device of claim 14, wherein the suggested display is selected based on content within an application view.

17. The device of claim 14, wherein the suggested display is selected based on application type associated with an application view.

18. The device of claim 11, wherein the identified context comprises a location of access of the at least one application view.

19. The device of claim 11, wherein the instructions that generate a profile comprises instructions that generate a profile for an identified user accessing the at least one application view.

20. A program product, comprising:

a non-signal storage device having program code embodied therewith, the program code being executable by a processor and comprising:

program code that displays, on a display, at least one application view and at least two virtual monitor icons;

program code that receives, from a user, an input selecting at least one of the at least one application views and selecting a display from the group consisting of: the display and another display, each being represented by one of the at least two virtual monitor icons;

program code that generates a profile for an identified context based upon associating the selected at least one application view with the selected display, wherein the profile is based on a user preference of a display selection of the at least one application view, parameters of the selected display, a location of the display, and a set of applications detected, wherein an indication of the at least two virtual monitor icons associated with the selected display is provided upon subsequent identification of the identified context based upon the profile; and program code that repositions, based upon an activation of the profile of the identified context, the selected at least one of the at least one application views to the associated selected display.

* * * * *